(No Model.)
S. SCOGNAMILLO & C. DOMINICI.
PEDAL FOR BICYCLES.
No. 527,349. Patented Oct. 9, 1894.
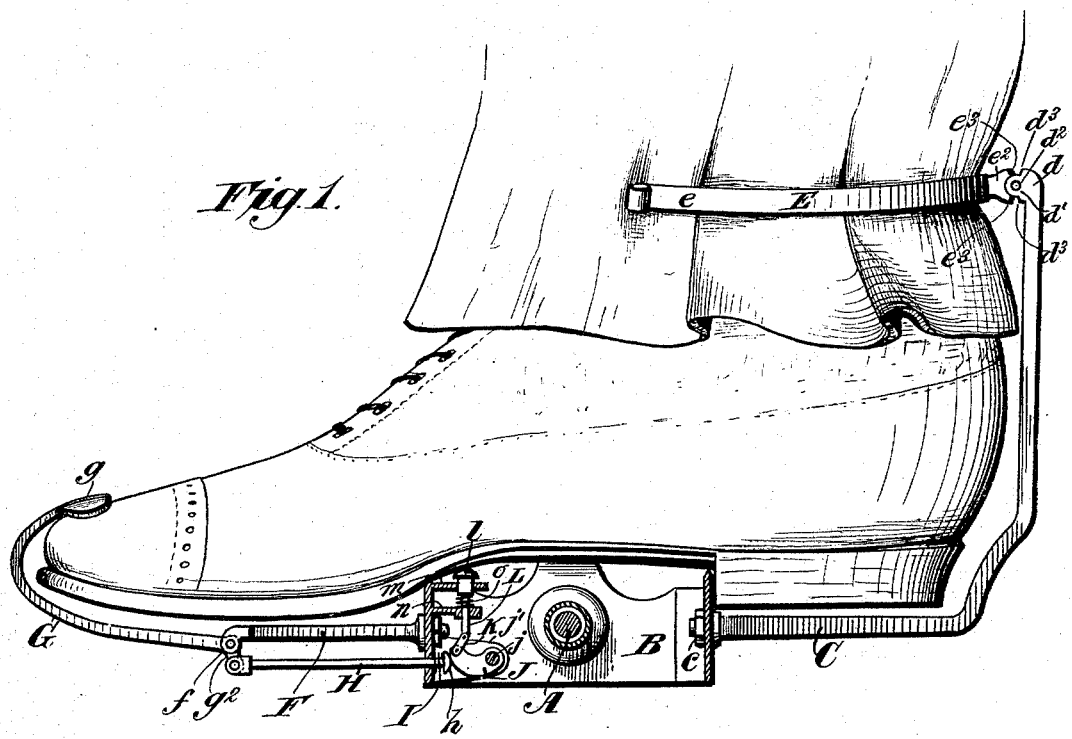
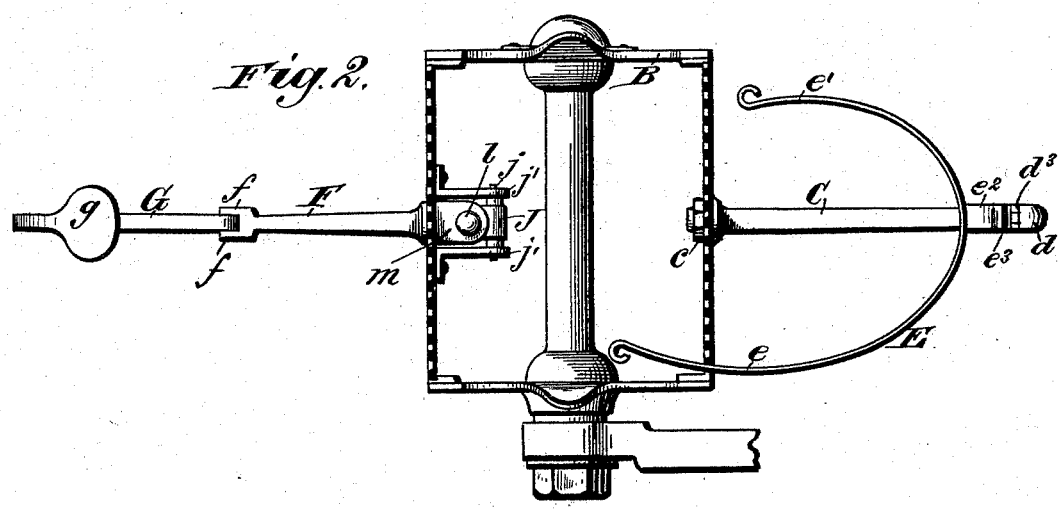
Witnesses.
Robert Erratt
Dennis Sumby.
Inventors.
Salvatore Scognamillo.
Christopher Dominici.
By James L. Norris.
Atty.

UNITED STATES PATENT OFFICE.

SALVATORE SCOGNAMILLO AND CHRISTOPHER DOMINICI, OF RICHMOND, VIRGINIA.

PEDAL FOR BICYCLES.

SPECIFICATION forming part of Letters Patent No. 527,349, dated October 9, 1894.

Application filed July 11, 1894. Serial No. 517,238. (No model.)

*To all whom it may concern:*

Be it known that we, SALVATORE SCOGNAMILLO and CHRISTOPHER DOMINICI, citizens of the United States, residing at Richmond, in the county of Henrico and State of Virginia, have invented new and useful Improvements in Pedals for Bicycles, &c., of which the following is a specification.

This invention relates to pedals or pedal attachments for bicycles and other foot driven vehicles, and has for its object to provide a pedal with novel means for automatically grasping and confining the trousers about the ankle of the rider in such manner that they will not be caught or soiled by the machine.

The invention also has for its object to provide new and improved means for automatically engaging and retaining the foot of the rider in place on the pedal.

To accomplish these objects our invention consists in the features, and the combination or arrangement of parts hereinafter described and claimed, reference being made to the accompanying drawings, in which—

Figure 1 is a side elevation, partly in section, of a pedal provided with our invention; and Fig. 2 is a plan view of the same.

In order to enable those skilled in the art to make and use our invention, we will now describe the same in detail, referring to the drawings, wherein—

The letter A indicates the pedal-shaft, and B the pedal-frame journaled thereon.

To the rear portion of the pedal frame B is secured by means of a nut $c$, a rod C that extends rearwardly a suitable distance and is then bent upward and terminates in a hinge butt $d$ consisting of two perforated ears $d'$ adapted to receive a pintle or hinge-pin $d^2$ and two shoulders $d^3$ lying above and below and in the rear of said ears $d'$.

To the hinge butt $d$ is pivotally connected the trousers clasp E, consisting of a strip of steel or other suitable resilient material, bent into substantially a U-shaped or horseshoe form, the inner member $e$ of which is preferably made somewhat longer than the outer member $e'$, for the purpose hereinafter described.

Secured to, or forming a part of the clasp E, at its rear central portion, is a lug $e^2$ adapted to fit between the perforated ears $d'$ and pivotally secured thereto by the hinge-pin $d^2$, said lug being provided with shoulders $e^3$ similar to the shoulders $d^3$ before described. As thus constructed the shoulders $d^3$, $e^3$, serve to maintain the clasp E in a horizontal position, whereby it is always in the proper position for the insertion of the foot of the rider, and yet permits of a slight oscillating or vibratory movement thereof with respect to the rod C to permit the clasp accommodating itself to the movement of the ankle without chafing or rubbing the trousers.

To the forward portion of the pedal B is secured a rod F, the outer end of which is provided with two perforated ears $f$, between which is pivotally secured one end of the toe-clamp G, consisting of a rod which at its forward end is bent upward and thence rearwardly, terminating in a flat and preferably curved plate $g$, adapted to rest over and bear upon the toe of the rider's shoe, the other end being pivoted between the ears $f$, as before described, and bent downward at a right angle, as at $g^2$, and pivotally secured to one end of a rod H, the other end of which passes through a perforation formed in the forward portion of the pedal and is provided with a head $h$, between which and the pedal frame is disposed a coiled spring I that acts to draw the rod H rearwardly and thus swing the clamp G downward.

J indicates a cam mounted on a pivot-pin $j$ journaled in brackets $j'$ riveted to the forward portion of the pedal, the forward end of said cam engaging the headed end of the rod H and having pivotally secured thereto one end of a link K, the other end of which is similarly connected to a push-rod L, said rod being supported in brackets $m$, $n$, secured to the pedal and provided at its upper end with a head $l$, a coiled spring $o$ being disposed between the head $l$ of the push-rod and the bracket $n$ and acting to raise said rod and with it the free end of the cam J.

The operation of our improved pedal will be readily understood. In placing the foot upon the pedal it is given a backward movement, causing the clasp E to embrace the ankle, and the sole of the foot bears upon the head $l$ of the push-rod L, depressing the latter and forcing the cam J against the head of the rod H, thrusting the latter forward and swinging up the toe clamp G about its pivot and engaging the toe of the rider's shoe. The foot of the rider is thus held in the proper position upon the pedal and will not slip off therefrom in riding over rough or uneven ground. In dismounting the moment the foot is raised the pressure is removed from the push-rod L which is raised by the spring $o$, carrying with it the cam J, upon which the spring I retracts the rod H and swings the clamp G downward out of engagement with the foot of the rider. A slight forward movement of the foot releases the ankle from the clasp E.

By equipping the pedal with the trousers clamp, as described, we avoid the necessity of the rider carrying separate clamping devices which have to be clasped on and taken off the ankles by hand, our improved clamp automatically adjusting itself in place upon the ankle by the act of placing the foot in place upon the pedal. The toe clamp, also, serves to prevent the foot from slipping from the pedal, a result that frequently occurs in riding over rough and uneven ground. Moreover, all liability of the rider's foot being caught in the pedal in the event of the rider being thrown from the machine is avoided by constructing the clamp in the manner described, said clamp being instantly disengaged from the foot the moment the pressure upon the push-rod is relieved.

We have described our improved pedal as being more particularly designed for use in connection with a bicycle or other foot driven vehicle, but it will be apparent that it may be employed in connection with machinery or devices of any nature that are operated by foot power.

Having described our invention, what we claim is—

1. The combination with a pedal, of a trousers clasp carried thereby, substantially as described.

2. The combination with a pedal, of a trousers clasp pivotally connected therewith, substantially as described.

3. The combination with a pedal, of a trousers clasp consisting of a bent spring adapted to embrace the ankle and pivotally connected to a rod secured to the pedal, substantially as described.

4. The combination of a pedal-frame having a forwardly extending arm or rod, a toe-clamp pivoted to said arm or rod and curved at its front end to project over the toe of the rider's foot, a lengthwise movable rod pivotally connected at one end with the pivoted extremity of the toe-clamp, and devices carried by the pedal and operated by the rider's foot to longitudinally shift the lengthwise movable rod and swing the toe-clamp, substantially as described.

5. The combination with a pedal, of a toe-clamp pivotally connected therewith, a rod for throwing said clamp into and out of engagement with the foot, and a cam operated by the pressure of the foot for actuating said rod, substantially as described.

6. The combination with the pedal B, of the toe-clamp G pivotally secured to a rod F carried by the pedal and provided with an elbow $g^2$, a rod H pivotally secured to said elbow, a spring for retracting said rod, a cam J engaging the end of said rod, a push rod L connected at one end to said cam and at its other end projecting above the pedal, and a spring for raising said push-rod, substantially as described.

In testimony whereof we have hereunto set our hands and affixed our seals in presence of two subscribing witnesses.

SALVATORE SCOGNAMILLO. [L. S.]
CHRISTOPHER DOMINICI. [L. S.]

Witnesses:
V. HECHLER,
WM. W. GROSSWELL.